United States Patent [19]

Hall, Sr.

[11] Patent Number: 4,876,043
[45] Date of Patent: Oct. 24, 1989

[54] HOPPER TRANSPORT FOR INJECTION MOLDING

[76] Inventor: Richard A. Hall, Sr., Rte. 1, Box 24AC, LaCenter, Wash. 98629

[21] Appl. No.: 235,433

[22] Filed: Aug. 23, 1988

[51] Int. Cl.$^4$ .............................................. B29C 45/18
[52] U.S. Cl. ....................... 264/39; 222/162; 222/275; 222/413; 264/328.1; 366/76; 366/181; 425/578
[58] Field of Search ....................... 264/39, 328.1, 349; 425/145, 578; 366/76, 177, 181; 222/160, 162, 144.5, 482, 413, 145, 274, 275

[56] References Cited

U.S. PATENT DOCUMENTS

| | | | |
|---|---|---|---|
| 4,418,844 | 12/1983 | Hehl | 425/582 |
| 4,418,845 | 12/1983 | Hehl | 222/162 |
| 4,629,410 | 12/1986 | Hehl | 425/145 |

OTHER PUBLICATIONS

LinTech Products, Catalog, 1983, pp. 1-30.

Primary Examiner—Jan H. Silbaugh
Assistant Examiner—Jill L. Heitbrink
Attorney, Agent, or Firm—Marger & Johnson

[57] ABSTRACT

Methods and apparatus for feeding raw polymeric material in pellet form from a hopper into the input opening of an injection molding machine. The apparatus includes a carriage for supporting the hopper upright and a track assembly to which the carriage is slidably connected for allowing repositioning of the hopper. The track assembly includes a feed port arranged so that when the carriage is positioned aligned with the feed port, the raw material flows due to gravity from the hopper, through the feed port and into the machine. A preferred embodiment includes a dual-hopper transport having two carriages slidably mounted on a single track assembly. Cleanout ports are provided in the track assembly for discharging unused raw materials from the hopper.

8 Claims, 3 Drawing Sheets

FEED  STANDBY  CLEANOUT

HOPPER TRANSPORT FOR INJECTION MOLDING

BACKGROUND OF THE INVENTION

This invention relates to the field of injection molding into useful articles of polymeric raw materials and, more specifically, includes methods and apparatus for feeding the polymeric raw materials from a hopper into the interior of an injection molding machine.

Injection molding machines generally include a funnel-shaped hopper for holding polymeric raw material to be used in the injection molding process. The polymeric raw material typically is in the form of small pellets, for example, on the order of ⅛" in diameter and up to ⅜" in length. Typical polymeric raw materials include nylons, polyacrylates, polycarbonates, polyvinylchloride resins, ABS resins, polyolefins or other polymeric material. The hopper is filled by a loader which includes vacuum apparatus for sucking the pellets from a sack, drum or other receptacle in which they have been received for processing and depositing the pellets in the hopper. The hopper is positioned over the trunnion inlet to the injection molding machine. The pellets flow due to gravity out of the bottom of the hopper and into the interior of the injection molding apparatus. Additionally, it is common practice to insert a magnet box between the hopper and the trunnion to collect metal foreign material such as nuts and bolts, to keep them from entering the injection molding machine. It is also common to insert a color mixer between the hopper and the trunnion, optionally in combination with a magnet box, for providing color powders or other materials to be mixed with the polymeric material pellets. The hoppers in commercial use are designed to hold up to several thousand pounds of raw materials.

Generally, after an injection molding run or job is completed, the hopper is emptied of unused material, cleaned out if necessary, and reloaded with new material for a subsequent job. Because of its weight and bulk, removing and repositioning the hopper is difficult and time-consuming, often requiring the use of a lift truck, crane or other heavy machinery. While the hopper is moved aside for emptying or cleaning, the injection molding machine lies idle, thereby diminishing the productivity of the overall operation. If a second hopper is available, the machine is idled while the second hopper is moved into place, bolted on and loaded.

Often, it is also necessary to dry the raw material pellets before they are used in the injection molding process. To do so, the pellets are first loaded into a hopper, then a dryer is attached to the hopper and operated to dry the pellets. This procedure can take several hours. After the material is dry, the hopper can be mounted on to the trunnion to begin the injection molding process. Thus, drying also causes substantial downtime of the injection molding machine. Where a second hopper is incorporated for drying, it is nonetheless necessary to reposition the hoppers, as described above, as part of the injection molding process.

Accordingly, a need exists to improve the productivity and efficiency of injection molding operations by reducing the down-time occasioned by handling, clearing and cleaning input hoppers.

SUMMARY OF THE INVENTION

In accordance with the foregoing, it is an object of the present invention to provide for repositioning injection molding hoppers without the use of heavy equipment. It is a further object of the present invention to provide for drying raw material in a hopper while an injection molding process is ongoing. Still a further object of the present invention is to provide for clearing a hopper without removing it from the injection molding machine and, preferably, allowing the injection molding process to proceed with a second hopper simultaneously with clearing the first hopper.

The present invention includes a hopper transport means for feeding polymeric raw material from a material hopper into an injection molding apparatus having an input opening. The hopper transport generally comprises a carriage for supporting the hopper in a substantially upright position, and a track assembly to which the carriage is movably connected, for supporting the carriage and maintaining the hopper in a substantially upright position while allowing repositioning of the carriage along the longitudinal axis of the track assembly. The carriage has a central aperture for receiving material that flows from the hopper. The track assembly has a feed port for allowing flow of the material from the central aperture through the feed port when the carriage means is positioned along the track means axis aligned with the feed port. The track assembly prevents flow of material when the carriage is positioned offset from the feed port.

The track assembly is removably connectable to the machine such that the feed port is aligned with the input opening so that material that flows through the feed port enters the input opening. In one embodiment, the track generally consists of a base plate and a pair of parallel rails which define a track. The flat, rectangular base plate has top and bottom faces and including said feed port, and is connectable along the bottom face to the machine, positioned so that the feed port is substantially aligned over the input opening in the machine. The rails are supported by a corresponding pair of parallel rail supports spaced apart along the top face of the base plate, positioned parallel to the longitudinal axis of the plate and positioned offset to each side of the feed port.

The carriage consists of a flat, rectangular carriage plate including the central aperture; a transition tube, connected around its top end to the underside of the carriage plate and extending below the carriage plate, sized and positioned to receive substantially all material that flows through the central aperture; and a plurality of bearing blocks fixed to the carriage plate and slidably engaged onto the rails for allowing repositioning of the carriage plate along the rails. The bearing blocks and the transition tube are sized so as to provide clearance between the bottom end of the transition tube and the base plate while preventing the raw material from escaping between the bottom end and the base plate.

In another embodiment, the track assembly includes a cleanout port in the base plate for allowing flow of the material from the central aperture through the cleanout port when the carriage means is positioned along the track means axis aligned with the cleanout port, to discharge unused material from the hopper.

In yet another embodiment of the invention, a second carriage, similar to the first carriage, is movably connected to the track assembly for supporting a second hopper. In that embodiment, the track assembly is longer than in the single-hopper version, and includes a second cleanout port. The feed port is positioned in the base plate intermediate the two cleanout ports. Thus, a cleanout port is available to each of the two carriages.

Either carriage may be discharged through its respective cleanout port while the other carriage is also discharged, in use at the feed port, or in an intermediate standby position, for example, for reloading. A standby position is one in which the carriage is offset from alignment with any of the ports. In a standby position, the base plate covers the bottom of the transition tube so that no material flows out of the hopper. Thus, the track assembly allows flow of material through the feed port from one of the hoppers at a time, when the corresponding carriage is positioned along the track axis aligned with the feed port.

The hopper transport further includes stops for maintaining one or both of the carriages plates in a the desired positions along the track. Additionally, a flat, rectangular adapter plate may be provided for connecting the track assembly to the machine. The adapter plate has attachment holes for attaching the adapter plate to the track base plate, and connecting holes for connecting the adapter plate to the machine. The adapter plate also has an aperture to allow the flow of material into the input opening when the adapter plate is connected to the machine covering the input opening. The adapter plate may include one or more of a variety of different connecting hole patterns for connecting the adapter plate to various injecting machines.

The present invention further includes methods of feeding polymeric raw material from a hopper into an input opening of an injection molding machine. The basic method includes providing a carriage for supporting the hopper in a substantially upright position; providing an elongate track assembly to which the carriage is movably connected for supporting the carriage and maintaining the hopper in a substantially upright position while allowing repositioning of the carriage along the longitudinal axis of the track, the track assembly having a feed port positioned aligned with the input opening so that material that flows through the feed port enters the input opening; loading the raw material into the hopper; positioning the carriage along the track axis aligned with the feed port to allow the material to flow out of the hopper and into the input opening; and operating the machine to injection mold the material.

The method further includes sliding the carriage along the rails to a position where the bottom of the transition tube is aligned with the feed port. Stopping the flow into the feed port may be done by repositioning the carriage to a position offset from alignment with the feed port, i.e. a standby position. Where the apparatus in use includes a cleanout port, the method further includes repositioning the carriage to a position aligned with the cleanout port to discharge unused raw material from the hopper through the cleanout port.

The methods further include providing a second carriage, movably connected to the track assembly for supporting a second hopper, the second carriage including a second central aperture for receiving material that flows from the second hopper. Where a second carriage is so provided, said loading includes loading a first raw material into the first hopper for a first injection molding job; said positioning includes positioning the first carriage to a position along the track axis aligned with the feed port; and said operating includes operating the machine to perform the first job.

The methods that employ a dual-hopper transport further include the steps of: while the first job proceeds, repositioning the second carriage to a position offset from the cleanout port; loading a second raw material into the second hopper for a second injection molding job; when the first job is completed, repositioning the first carriage to a position offset from the feed port to stop the flow of material from the first hopper; repositioning the second carriage to a position aligned with the feed port; and operating the machine to commence the second job.

Additionally, the methods include providing a second cleanout port, the feed port positioned intermediate the first and second cleanout ports. That arrangement supports the further the steps of: while the second job proceeds, repositioning the first carriage to a position aligned with one of the first and second cleanout ports; and discharging unused material from the first hopper through the selected cleanout port.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
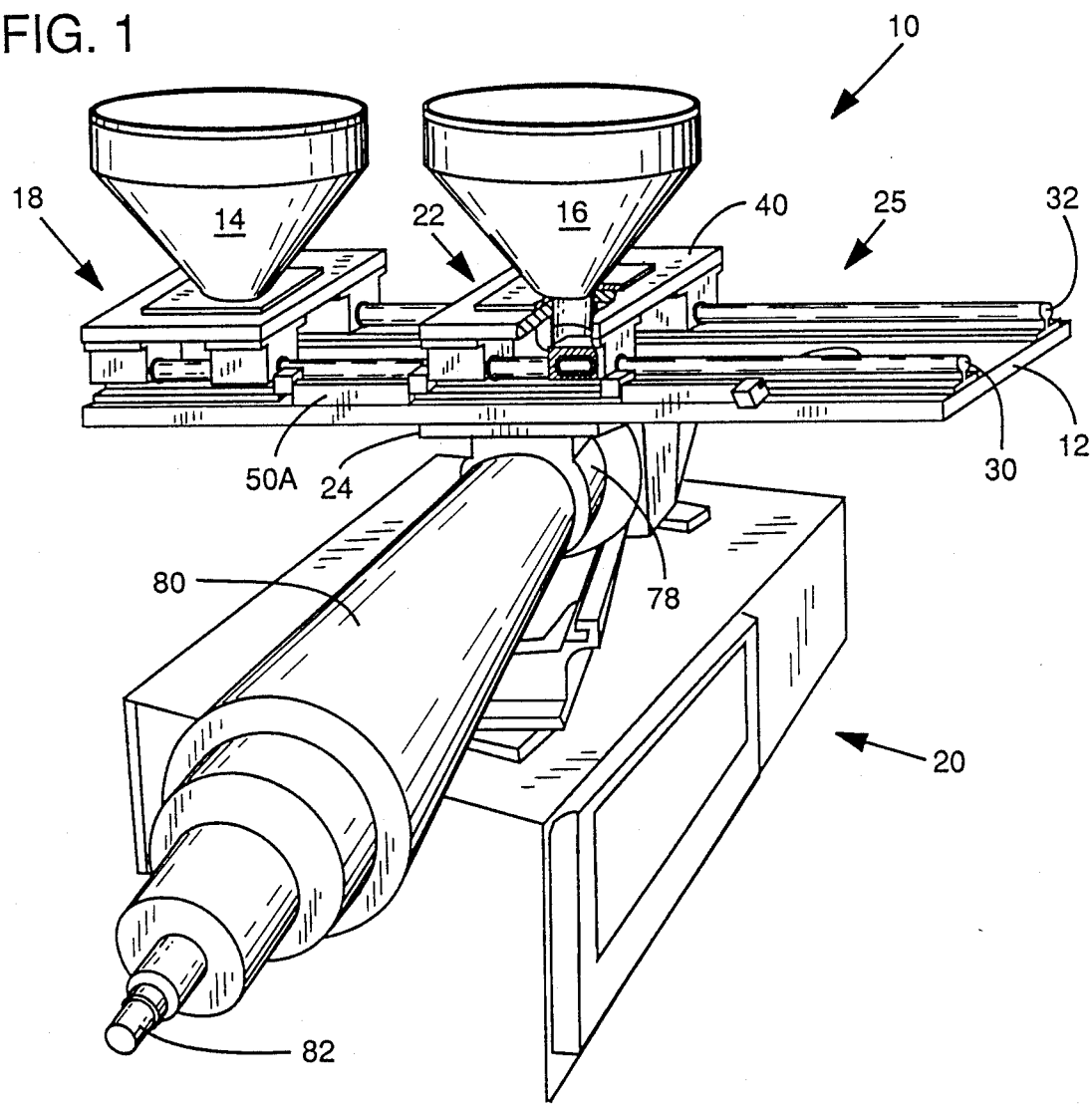
FIG. 1. is a perspective view of a dual-hopper transport in accordance with the present invention, mounted on the intake trunnion of an injection molding machine.

FIG. 1 is a perspective view of a dual-hopper transport 10, according to the present invention, mounted on an injection molding machine 20. The dual hopper transport 10 generally comprises a left carriage 18 for supporting a left hopper 14 and a right carriage 22 for supporting a right hopper 16. The two carriages are substantially identical. The carriages are slidably mounted on a track assembly 25 for selectively positioning them as more fully described below. The track assembly 25 is connected to an adapter plate 24, positioned beneath a central portion of the track assembly 25. The adapter plate 24, in turn, is connected to the inlet trunnion 78 of the injection molding machine 20. The trunnion defines the input opening of the machine. When one of the carriages is moved to a predetermined run position along the track assembly, as is carriage 22 in FIG. 1, raw material in the hopper 16 flows down through the carriage 22, track assembly 25 and adapter plate 24 into the trunnion 78 for charging the injection molding machine.

Figure 2:
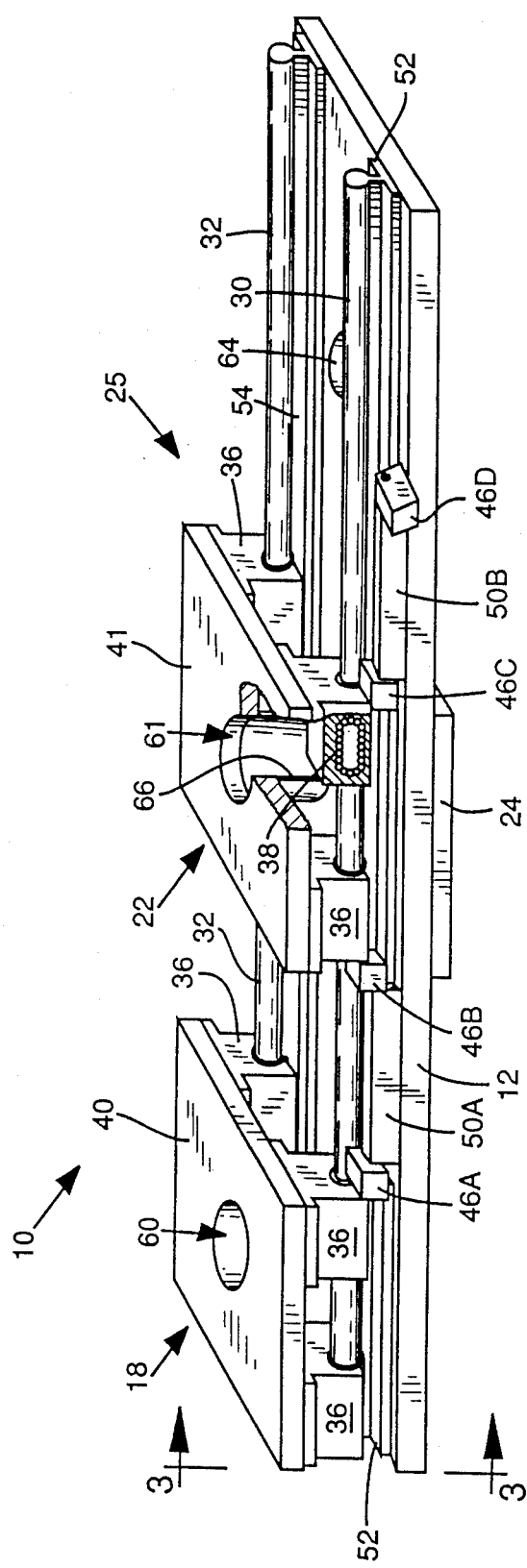
FIG. 2. is an enlarged perspective view of the dual-hopper transport of FIG. 1 with the right carriage partially broken away to reveal additional detail.

FIG. 2 shows carriages 18 and 22 and track assembly 25 in greater detail. Left carriage 18 includes a flat carriage plate 40 having a central aperture 60 for allowing raw material to flow through the carriage plate 40. The aperture 60 is sized as appropriate to the trunnion and hopper, typically about 2½ inches in diameter. The right carriage 22 is substantially identical to the left carriage 18. The right carriage includes a carriage plate 41 having a central aperture 61.

Four identical bearing blocks 36 are fixed to the underside of each carriage plate 40,41. The bearing blocks are positioned under the corners of the carriage plates so as to leave the areas beneath the central apertures unobstructed.

Track assembly 25 generally comprises a parallel pair of rails, front rail 30 and rear rail 32. The "front" of track assembly 25 refers to the side having a pair of stop mounting blocks 50A and 50B (FIG. 2), discussed below. The rails 30 and 32 are supported by front and rear rail supports 52 and 54, respectively. Rail supports 52 and 54 are fixed to a flat base plate 12 to maintain them in a predetermined parallel, spaced apart relationship so that the rails 30,32 provide and define a track on which the carriages may be slidably positioned. The carriages are free to move independently of each other, though they cannot occupy the same position nor overtake one another as they are on one track.

Bearing blocks 36 are slidably engaged onto the rails 30,32. The bearing blocks have internal bearings 38 to contact the rails. Thus, the track assembly 25 provides a very low friction track. The track assembly 25 allows the carriages to be repositioned along the track assembly 25 with very little applied force, for example, a few ounces, even while the carriages support hoppers loaded with up to several thousand pounds of raw material. Rails of this type are available, for example, from LinTech Division of Monrovia, Calif. Overrun stops (not illustrated) are provided adjacent the ends of the base plate 12 to prevent either carriage from overrunning the ends of the rails.

Figure 3:
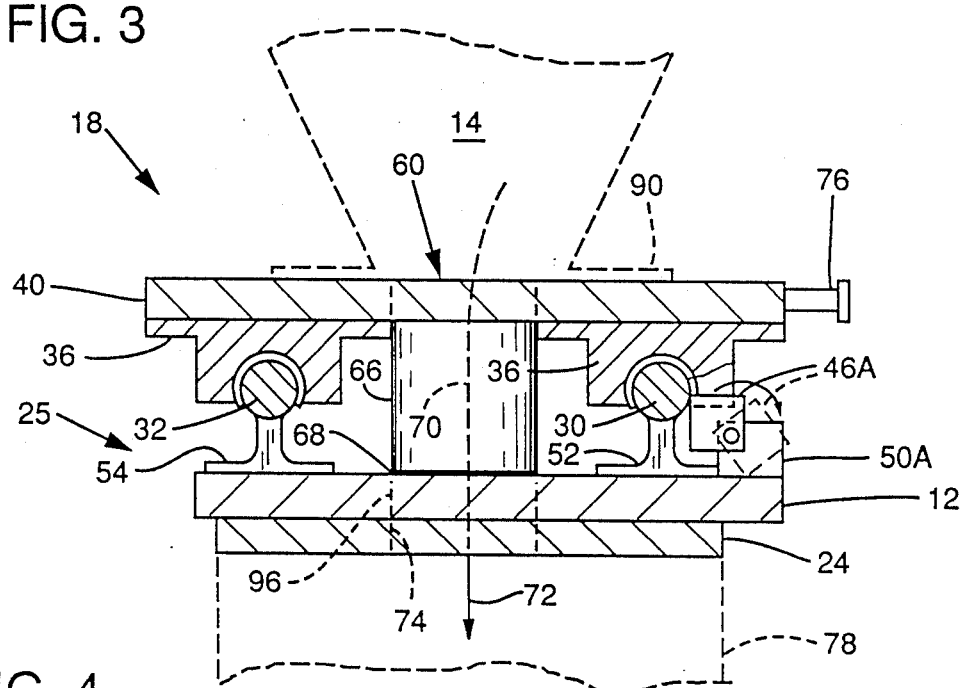
FIG. 3 is an end view of the hopper transport of FIG. 1 showing in phantom the positions of the hopper and intake trunnion.

FIG. 3 shows an end view of carriage 18 mounted on track assembly 25. The hopper 14 is shown in phantom, connected to top side of the left carriage plate 40. Hopper 14 typically includes a round flange 90 extending outwardly about the bottom of the hopper. The flange 90 is bolted to the carriage plate 40, positioned such that the bottom of the hopper is aligned over the central aperture 60. Some hoppers include a closure for closing the bottom of the hopper.

A transition tube 66, having a diameter substantially the same as the central aperture 60, is connected to the underside of carriage plate 40. The transition tube 66 is aligned beneath the central aperture 60 for receiving raw material from the hopper 14. The transition tube 66 has a length such as to provide a small gap 68 between the lower end of transition tube 66 and the top surface of the base plate 12. Thus, transition tube 66 does not contact the track assembly 25 at any time. The gap 68 is sized to prevent raw material pellets from escaping between the lower end of the transition tube 66 and the top surface of the base plate 12. Therefore, it is unnecessary for the hopper to have a gate or door for closing the hopper, as raw material is maintained in the hopper (and transition tube) by the base plate 12 except when the carriage is positioned over an aperture in the base plate, as more fully described below.

Figure 5:
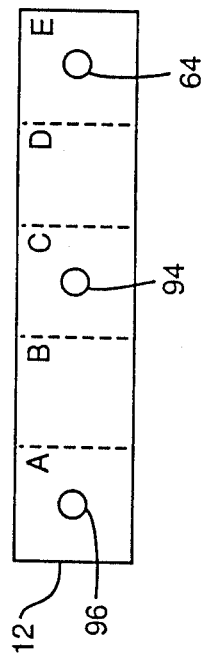
FIG. 5 is a top view of the base plate (12) of the hopper transport of FIGS. 1 and 2, showing carriage positions A through E.

Referring now to FIG. 5, base plate 12 includes three apertures for allowing raw material to pass through it. These are identified in FIG. 5 as left cleanout port 96, feed port 94 and right cleanout port 64. The three apertures 96,94,64 are approximately equally spaced apart and centered along the length of base plate 12. Right cleanout port 64 is partially visible in FIG. 2. Feed port 94 is covered in FIG. 2 by right carriage 22. Left cleanout port 96 is obscured in FIG. 2 by left carriage 18.

Each of the ports 96,94,64 has approximately the same diameter as transition tube 66.

The ports are positioned on base plate 12 equidistant from the rails so that the carriages may be moved along the rails to selectively position the transition tubes over the apertures to allow material to flow therethrough. This feature is best viewed in FIG. 3, where transition tube 66 is shown aligned over cleanout port 96. Raw material in the hopper 14 flows due to gravity as indicated by dashed line 70, through central aperture 60, transition tube 66, and cleanout port 96. Solid line 72 indicates that the material does not flow through the adapter plate 24. In this view, the adapter plate 24 is behind cleanout port 96.

Adapter plate 24 is a rigid, flat plate, connected to a central portion of the underside of base plate 12. Adapter plate 24 has a central aperture 74, indicated by dashed lines in FIG. 3. Aperture 74 has a diameter substantially equal to the diameter of feed port 94 in base plate 12. The adapter plate is positioned substantially centered with respect to the length of the base plate 12 and with the aperture 74 aligned beneath feed port 94. The adapter plate allows connecting a hopper transport to any of several injection molding machines having different mounting hole patterns on the trunnions. Different adapter plates may be fashioned, each one having a hole pattern corresponding to the mounting holes in a particular model trunnion, or a single adapter plate may have multiple patterns of mounting holes. Thus, the adapter plate provides for bolting the hopper transport onto any of the variety of different trunnions made by different manufacturers, while maintaining a standard hole pattern for connecting the adapter plate to the base plate.

Referring again to FIG. 2, four stop blocks 46A through 46D are provided for maintaining the carriages in any of several predetermined positions described below. The stop blocks are pivotally mounted to stop mounting blocks 50A and 50B. The stop mounting blocks 50A and 50B are fixed to base plate 12 along the front edge thereof. The stop mounting blocks 50A and 50B are sized and positioned so that the carriages may slide past the stop mounting blocks without contacting them. Each of the stop blocks, for example, stop block 46A, is pivotally connected to one end of a corresponding stop mounting block. Thus, stop blocks 46A and 46B are connected to the ends of stop mounting block 50A and stop blocks 46C and 46D are pivotally connected to the ends of stop mounting block 50B. The stop blocks are substantially identical.

Each of the stop blocks is mounted and adapted to pivot between two operative positions. In the off position, as stop block 46D is shown, the stop block does not interfere with movement of the carriages 22 past the stop block. In the "on" or "stop" position, the stop block is rotated to a position such that it prevents the carriage assembly from moving past the stop block, as the stop block in the "on" position contacts the bearing block 36. This operation is best seen in end view in FIG. 3. Here, stop mounting block 50A is shown in end view. Stop block 46A is shown pivoted into the "on" position. Stop block 46A is shown in phantom in the "off" position.

Operation of the dual-hopper transport of FIGS. 1 and 2 is illustrated by reference to FIG. 5. FIG. 5 is a diagram representing a top view of the base plate 12. The figure indicates five carriage positions designated by the letters A through E. Positions A,C and E are aligned over ports 96, 94 and 64, respectively. Intermediate positions B and D are standby positions in which the transition tube is closed off by the base plate 12. It is assumed that a hopper transport including base plate 12 is mounted, as shown in FIG. 1, so that the feed port 94 is aligned over the entrance to the trunnion for charging the injection molding machine. It is further assumed that arrangements are made for receiving unused material through the cleanout ports 96 and 64. Operation may proceed as follows:

Step 1. The carriages are positioned as shown in FIG. 1: the left carriage is in position A and the right carriage is in position C. The injection molding machine 20 is in use performing a first job. Thus, it is receiving raw material through the right carriage from the right hopper.

Step 2. While step 1 is in progress, the left hopper is cleared of unused material through the left discharge port 96.

Step 3. While step 1 continues, the left carriage is moved to position B so that the transition tube is closed off. The left hopper is then loaded with raw material. The raw material now in hopper 14 may be dried, if necessary, while step 1 continues. The left hopper may be filled with additional material for the first job, or new material for a second job.

Step 4. When the first injection job is completed, the right carriage is moved to standby position D or to cleanout position E. Cleaning material may be dumped into the machine by hand through feed port 94 for cleaning the machine between jobs or preparatory to shutdown.

Step 5. The left carriage is moved to position C to begin the second job, thereby minimizing delay between jobs.

Step 6. While the second job proceeds, the right hopper can be cleaned out, moved to the standby position and refilled, and otherwise prepared for the next use. Raw material may be dried in the standby hopper if necessary.

Step 7. At the conclusion of the second job, the left hopper is moved to position A or position B, and the right hopper is moved to position C to begin a third job.

The foregoing sequence is repeated for subsequent jobs. The carriages may be locked in each of the positions described above by operating the stops. Use of the dual-hopper transport assembly, as described above, substantially reduces the down-time of the injection molding machinery by having a fresh supply of raw material ready at the conclusion of a given job. The methods and apparatus described above also enable a single operator to carry out these operations without the need for heavy equipment, even where hundreds of pounds of raw material are being moved, as a result of the very low friction of the apparatus disclosed.

The principles illustrated here could, of course, be further extended to accommodate more than two carriages and hoppers. Additionally, it is not essential that the rails be linear. A circular track assembly might be proposed for operation in a similar fashion. One or more loaders could be positioned around such a circular track assembly for loading raw material into a hopper when the hopper is moved into a load position beneath the loader, for example.

In one operative example of the dual hopper transport, the adapter plate 24, base plate 12 and carriage plates 40, 41 all are constructed of ¾" thick steel plate. The carriage plates measure 10" square and the base plate is 10" wide and 48" long. The support rails 30 and 32 are 1" diameter, 48'" long linear ways made by Lin-Tech Division of Monrovia, Calif., Part No. SA16-48. The "linear ways" from LinTech include both the rail or shaft and the support (52, 54). The bearing blocks 36 are Thomson Super Ball Bushing ® Pillowblocks ®, also available from LinTech. The stop blocks and stop mounting blocks are fabricated of aluminum.

Figure 4:
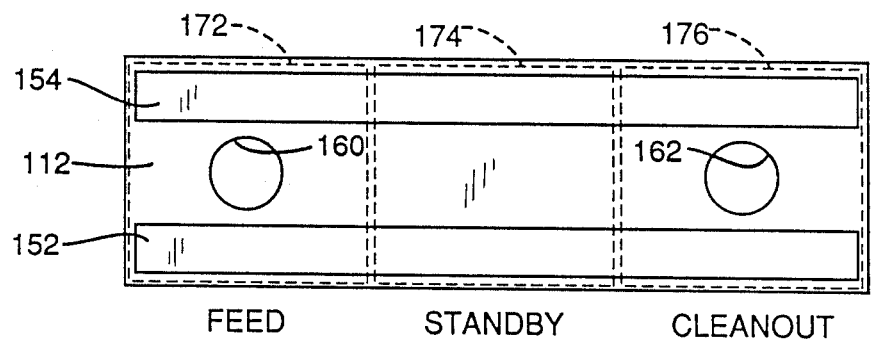
FIG. 4 is a top view of the base plate of a single-hopper alternative embodiment of a hopper transport.

Referring now to FIG. 4, the base plate 112 of an alternative embodiment of a hopper transport is illustrated. The alternative embodiment includes a single carriage assembly for positioning one hopper. The carriage is mounted on a track assembly that is similar to that described above. The rail supports are indicated by rectangles 152 and 154. The alternative base plate 112 has only two apertures, rather than three. The apertures are a feed port 160 and a cleanout port 162. The alternative base plate 112 may be shorter than dual-hopper base plate 12.

In use, the single-hopper transport is connected to an injection molding machine such that the feed port 160 is aligned over the entrance to the trunnion of the injection molding machine. Base plate 112 may be bolted directly to the trunnion or an adapter plate may be employed between the trunnion and the base plate, as described above.

An injection molding operation employing the single-hopper transport may proceed as follows. In FIG. 4, dashed box 172 indicates a first, or run, position of a carriage in which the transition tube is aligned over feed port 160. The carriage may be locked in position 172 using stops as described above. The loader is activated to load the hopper with raw material, and a first injecting job proceeds with the raw material flowing through the hopper, carriage and track assembly into the injection molding machine.

When the first job is completed, the raw material is depleted or the injection machine is stopped for any reason, the stop is turned to the off position, and the carriage repositioned to a standby position indicated by dashed box 174. In the standby position 174, any unused raw material remains in the hopper and transition tube, as the bottom of the transition tube is covered by the base plate 112. Repositioning the carriage assembly requires only a few ounces of force by the operator, even though the hopper may still contain hundreds or even thousands of pounds of material. A handle 76 (FIG. 3) may be provided, preferably on the front of the carriage, for repositioning the carriage.

To clean out the hopper, for example in preparation for a second injection molding job using a different raw material, the operator connects a discharge hose or positions a receptacle beneath cleanout port 162 for receiving the unused raw material. The operator then slides the carriage assembly into position, indicated by dashed box 176, so that the transition tube is aligned over the cleanout port 162. The raw material remaining in the hopper then flows due to gravity out of the hopper and transition tube. A downward extending flange (not shown) may be provided on the underside of the base plate aligned with the clean-out port to facilitate attaching a discharge hose for receiving material discharged through the clean-out port. While the carriage is in the standby position 174 or cleanout position 176, the feed port 160 is opened to allow dumping material into the trunnion by hand for cleaning out the injection molding machine between jobs.

Having illustrated and described the principles of my invention in a preferred embodiment thereof, it should be readily apparent to those skilled in the art that the invention can be modified in arrangement and detail without departing from such principles.

I claim all modifications coming within the spirit and scope of the accompanying claims:

1. A method of feeding polymeric raw materials from a pair of hoppers into an input opening of an injection molding machine, the method comprising the steps of:

providing an elongate track over the machine upon which each of the hoppers is supported in an upright position for manual sliding movement along the track longitudinal axis independently of the other hopper;

loading raw material into the first hopper;

positioning the first hopper over the input opening to allow material to flow from the first hopper into the input opening to provide raw material for a first injection molding job;

actuating the machine to commence the first job;

while the first job proceeds, positioning the second hopper at a standby position for loading; and while the first job proceeds, loading the second hopper with raw material to prepare for commencing a second job thereby minimizing machine down-time after completion of the first job.

2. A method according to claim 1 wherein the track includes an open cleanout port offset from the machine input opening; and said method further including the steps of:

repositioning the first carriage, when the first job is completed, to a position offset from the input opening to stop the flow material from the first hopper;

repositioning the second carriage to a position aligned over the in put opening;

actuating the machine to commence the second job; and while the second job proceeds, repositioning the first carriage over the cleanout port to discharge unused material.

3. A hopper transport apparatus for feeding polymeric raw material from a material hopper into an injection molding machine having an input opening, said apparatus comprising:

a substantially planar carriage plate for supporting the hopper in a substantially upright position and having a central aperture through which material from the hopper can flow;

a transition tube connected around its top end to the underside of the carriage plate and extending therebelow for receiving material flowing through said central aperture;

bearing blocks mounted on the underside of said carriage plate;

a substantially planar base plate connectable to said machine and having a feed port therethrough which is aligned over said input opening;

an elongate track mounted on top of said base plate for supporting the carriage plate, the track having said bearing blocks engaged therewith for sliding said carriage plate into a first position in which said transition tube is aligned over the feed port for discharging material from said hopper into said input opening and into a second position in which the lower end of said transition tube is offset from the feed port to prevent flow of material from the hopper;

the base plate, track, and bearing blocks being constructed and arranged to maintain the carriage plate spaced apart from the base plate to prevent frictional engagement therebetween.

4. A hopper transport apparatus according to claim 3 including:

a pair of parallel rail supports spaced apart along the top of the base plate, positioned to each side of the feed port; and a pair of cylindrical rails, each connected to a corresponding one of the rail supports; and wherein said bearing blocks include first bearing blocks engaged with a first one of the pair of rails and second bearing blocks engaged with the other one of the pair of rails.

5. A hopper transport apparatus according to claim 3 including:

a second carriage plate movably connected to the track independently of the first-mentioned carriage plate for supporting a corresponding second hopper, the second carriage plate having a second central aperture for receiving material that flows from the second hopper; and wherein the base plate includes:

means defining a first cleanout port for allowing flow of the material from the first central aperture through the first cleanout port when the first carriage plate is positioned along the track aligned with the first cleanout port, to discharge unused material from the first hopper; and means defining a second cleanout port for allowing flow of the material from the second central aperture through the second cleanout port when the second carriage plate is positioned along the track aligned with the second cleanout port, to discharge unused material from the second hopper; and the track is arranged to allow flow of material through the feed port from one of the first carriage plate, when the first carriage plate is positioned along the track aligned with the feed port, and the second carriage plate, when the second carriage plate is positioned along the track aligned with the feed port, while allowing repositioning of the carriage plate that is not aligned with the feed port.

6. A hopper transport according to claim 5 including stop means for maintaining one of the carriage plates in a selected one of said aligned positions.

7. A hopper transport according to claim 5 including a flat rectangular adapter plate for connecting the base plate to the machine;

the adapter plate including attachment holes for attaching the adapter plate to the base plate, connecting holes for connecting the adapter plate to the machine, and an adapter plate aperture for allowing flow of material into the input opening when the adapter plates is connected to the machine covering the input opening.

8. A hopper transport according to claim 7 wherein the adapter plate includes a plurality of connecting hole patterns for connecting the adapter plate to one of a corresponding plurality of different machines.

* * * * *